United States Patent
Lomp (10) Patent No.: US 12,520,390 B2
(45) Date of Patent: Jan. 6, 2026

(54) HEATING SYSTEMS

(71) Applicant: Prizer Painter Stove Works Inc., Blandon, PA (US)

(72) Inventor: Stéphane Lomp, Gambsheim (FR)

(73) Assignee: Prizer-Painter Stove Works, Inc., Blandon, PA (US)

( * ) Notice: Subject to any disclaimer, the term of this patent is extended or adjusted under 35 U.S.C. 154(b) by 0 days.

(21) Appl. No.: 19/092,779

(22) Filed: Mar. 27, 2025

(65) Prior Publication Data

US 2025/0247921 A1 Jul. 31, 2025

Related U.S. Application Data

(63) Continuation of application No. PCT/US2024/016871, filed on Feb. 22, 2024.

(60) Provisional application No. 63/448,122, filed on Feb. 24, 2023.

(51) Int. Cl.
*H05B 6/12* (2006.01)
*H05B 6/06* (2006.01)

(52) U.S. Cl.
CPC .................................. *H05B 6/1272* (2013.01)

(58) Field of Classification Search
CPC .. H05B 6/1277; H05B 6/1263; H05B 6/1272; H05B 2206/022; H05B 2213/03
USPC ....... 219/624, 620, 621, 622, 600, 623, 625, 219/626, 627, 660, 670, 672–676, 219/661–667
See application file for complete search history.

(56) References Cited

U.S. PATENT DOCUMENTS

| | | |
|---|---|---|
| 3,711,672 A | 1/1973 | Moreland, II et al. |
| 3,843,857 A | 10/1974 | Cunningham |
| 8,766,147 B2 | 7/2014 | Reischmann et al. |
| 8,878,108 B2 | 11/2014 | Kitaizumi et al. |
| 9,084,300 B2 | 7/2015 | Kataoka et al. |
| 9,095,005 B2 | 7/2015 | Reischmann et al. |
| 9,282,593 B2 | 3/2016 | Brosnan et al. |
| 9,491,809 B2 | 11/2016 | Shaffer et al. |
| 10,098,188 B2 | 10/2018 | Teramoto et al. |
| 10,172,187 B2 | 1/2019 | Lee et al. |
| 10,805,989 B2 | 10/2020 | Kim et al. |
| 10,883,723 B2 | 1/2021 | Yun et al. |
| 10,935,247 B2 | 3/2021 | Kim et al. |
| 11,029,033 B2 | 6/2021 | Je et al. |
| 11,153,942 B2 | 10/2021 | An et al. |
| 11,191,130 B2 | 11/2021 | Jung et al. |
| 11,653,422 B2 | 5/2023 | Lee et al. |
| 2009/0212042 A1 | 8/2009 | Lee et al. |

(Continued)

FOREIGN PATENT DOCUMENTS

| | | |
|---|---|---|
| CN | 202282882 U | 6/2012 |
| EP | 2048914 B1 | 10/2013 |

(Continued)

OTHER PUBLICATIONS

International Search Report and Written Opinion in International Appln. No. PCT/US2024/16871, mailed on Jun. 26, 2024, 14 pages.

(Continued)

*Primary Examiner* — Quang T Van
(74) *Attorney, Agent, or Firm* — Fish & Richardson P.C.

(57) ABSTRACT

Some systems, devices and methods detailed herein provide induction coils and systems that include induction coils for heating one or more cookware devices.

10 Claims, 9 Drawing Sheets

(56) References Cited

U.S. PATENT DOCUMENTS

| | | |
|---|---|---|
| 2010/0176116 A1 | 7/2010 | Lee et al. |
| 2010/0237064 A1 | 9/2010 | Liu et al. |
| 2012/0248095 A1 | 10/2012 | Lee et al. |
| 2013/0112684 A1 | 5/2013 | Stoffler et al. |
| 2019/0068044 A1* | 2/2019 | Petrovich ............... G21C 15/00 |
| 2020/0329535 A1 | 10/2020 | Yun |

FOREIGN PATENT DOCUMENTS

| | | |
|---|---|---|
| EP | 3035772 A1 | 6/2016 |
| JP | 2015228351 A | 12/2015 |
| KR | 102306813 B1 | 9/2021 |
| KR | 20220156214 A | 11/2022 |
| WO | WO 2017093174 A1 | 6/2017 |

OTHER PUBLICATIONS

International Preliminary Report on Patentability in International Appln. No. PCT/US2024/16871, mailed on Sep. 4, 2025, 8 pages.

\* cited by examiner

Comparison of coverages

Pot centered between 2 Coils

Cookware 6.3 in.

| | Configuration | Coil surface in² | Not cover coil in² | Pot coverage in² | Percentage of coverage | Gain |
|---|---|---|---|---|---|---|
| Hybrid Shape. | #1 | 47,149544 | 33,154566 | 13,994978 | 29,68% | +2,62% |
| Square shape | #2 | 51,715853 | 37,720875 | 13,994978 | 27,06% | |
| Round Shape | #3 | 42,583235 | 30,952012 | 11,631223 | 27,31% | |

Cookware 7.1 in.

| | Configuration | Coil surface in² | Not cover coil in² | Pot coverage in² | Percentage of coverage | Gain |
|---|---|---|---|---|---|---|
| Hybrid Shape. | #4 | 47,149545 | 29,84066 | 17,308885 | 36,71% | +3,24% |
| Square shape | #5 | 51,715854 | 34,406969 | 17,308885 | 33,47% | |
| Round Shape | #6 | 42,583235 | 28,337157 | 14,246078 | 33,45% | |

Pot centered on Coil

Cookware 6.3 in.

| | Configuration | Coil surface in² | Not cover coil in² | Pot coverage in² | Percentage of coverage | Gain |
|---|---|---|---|---|---|---|
| Hybrid Shape. | #7 | 47,149545 | 17,347635 | 29,80191 | 63,21% | +5,58% |
| Square shape | #8 | 51,715854 | 21,913944 | 29,80191 | 57,63% | |
| Round Shape | #9 | 42,583236 | 12,781326 | 29,80191 | 69,99% | |

Cookware 7.1 in.

| | Configuration | Coil surface in² | Not cover coil in² | Pot coverage in² | Percentage of coverage | Gain |
|---|---|---|---|---|---|---|
| Hybrid Shape. | #10 | 47,149544 | 9,069068 | 38,080476 | 80,77% | +7,13% |
| Square shape | #11 | 51,715853 | 13,635377 | 38,080476 | 73,63% | |
| Round Shape | #12 | 42,583235 | 4,502759 | 38,080476 | 89,43% | |

FIG. 8

| Heat distribution | | | | |
|---|---|---|---|---|
| Pot centered between 2 Coils | | | | |
| Cookware 6.3 in. | | | | |
| Configuration | | Pot area in² | Pot coverage in² | Percentage of pot covered | Gain |
| Hybrid Shape. | #1 | 29,80191 | 27,989956 | 93,92% | +15,86% |
| Square shape | #2 | 29,80191 | 27,989956 | 93,92% | |
| Round Shape | #3 | 29,80191 | 23,262446 | 78,06% | |
| Cookware 7.1 in. | | | | | |
| Configuration | | Pot area in² | Pot coverage in² | Percentage of pot covered | Gain |
| Hybrid Shape. | #4 | 38,080476 | 34,61777 | 90,91% | +16,08% |
| Square shape | #5 | 38,080476 | 34,61777 | 90,91% | |
| Round Shape | #6 | 38,080476 | 28,492156 | 74,821% | |

FIG. 8 (Cont.)

HEATING SYSTEMS

CROSS-REFERENCE TO RELATED APPLICATIONS

This application is a continuation of PCT application no. PCT/US2024/016871 filed Feb. 22, 2024, which claims the benefit of U.S. Provisional Application No. 63/448,122, filed Feb. 24, 2023, the contents of each are incorporated by reference herein.

TECHNICAL FIELD

This document describes heating systems for providing improved induction heating.

BACKGROUND

Heating elements are used in cooktop systems to facilitate heating of the cooktop surface and items placed on the cooktop surface. Some cooktop systems use coil designs to provide heating to the cooktop surface and/or items placed on the cooktop surface such as pots, pans, and other cooking apparatuses. Coil designs can include induction coil designs that facilitate induction heating to the cooktop systems. Current induction coil designs include shapes such as round shapes, ovular shapes, and rectangular shapes.

SUMMARY

This document describes techniques, methods, and systems for heating systems including induction heating systems. For example, some types of heating systems and induction heating systems include induction coils that are implemented in cooktop systems for heating one or more cookware devices and/or to energize a small appliance by wireless power transfer. The shape of induction coils and the arrangement of induction coils in cooktop systems impact the performance of the induction coils and cooktop systems.

Implementations may include one or more of the following features. In an example embodiment, an induction coil is provided. The induction coil has an outer profile that includes a rounded portion and a rectangular portion, the rounded portion extends around a portion of the outer profile and the rectangular portion extends around another portion of the outer profile.

In an example embodiment, an induction coil is provided. The induction coil includes an induction coil that extends from a first end to a second end, the induction coil includes a plurality of turns defining a shape, the shape may include: an outer profile that includes a rounded portion and a rectangular portion, the rounded portion extends around a portion of the outer profile and the rectangular portion extends around another portion of the outer profile.

Implementations may include one or more of the following features. The induction coil may have a first set of turns having a first radius and a second set of turns having a second radius, where the first radius is larger than the second radius. The induction coil may include an inner profile that is positioned interior to the outer profile, the inner profile has a rounded shape. The induction coil may define one or more gaps between the rectangular portion of the outer profile and the inner profile. The outer profile forms a geometric shape having four radii. The outer profile defines four edges, where three of the four edges are straight edges and one curved edge. A ratio of a radius of the rounded portion to a width of the outer profile is about 2:1. The rounded portion may include a semi-circular outer shape. The rounded portion includes a plurality of turns of the induction coil that are formed in a successive winding pattern. The rectangular portion includes a plurality of turns of the induction coil that are formed in a successive winding pattern.

In an example embodiment, a cooktop system is provided. The cooktop system includes a plurality of induction coils, each induction coil may include: an induction coil that extends from a first end to a second end, the induction coil includes a plurality of turns that define a shape, the shape may include: an outer profile that includes a rounded portion and a rectangular portion, the rounded portion extends around a portion of the outer profile and the rectangular portion extends around another portion of the outer profile. The cooktop system also includes the plurality of induction coils includes a first group of induction coils and a second group of induction coils, where the rounded portion of the first group faces a first outer side of the cooktop system and the rounded portion of the second group faces a second outer side of the cooktop system.

Implementations may include one or more of the following features. The cooktop system where the rectangular portion of the first group faces the rectangular portion of the second group at an internal portion of the cooktop system. Each rectangular portion of the first group is aligned in an opposing arrangement with a respective rectangular portion of the second group. Each induction coils of the first group of induction coils is configured to generate a magnetic field that rotates in a first direction and each induction coil of the second group of induction coils is configured to generate a magnetic field that rotates in a second direction, the first direction is different from the second direction. The first direction and the second direction oppose one another. A ratio of a radius of the rounded portion to a width of the outer profile is about 2:1. The rounded portion of each induction coil may include a semi-circular outer shape. The cooktop system may include one or more gaps between the rectangular portion of the outer profile and an inner profile of each induction coil system. The first side and the second side are on opposing sides of the cooktop system.

Particular implementations can, in certain instances, realize one or more of the following advantages. For example, the described systems and methods can advantageously facilitate improved heat distribution and improved performance and efficiency of the induction coil and cooktop system with a higher percentage of coverage for a variety of cookware shapes and sizes.

Round coil shapes facilitate heat distribution within the round coil shape, and round coil shapes facilitate heating coverage of one or more pans (e.g., round or ovular cooking pans, pots). Cooktop systems can include a pattern of a plurality of round coil shapes that have gaps between each round coil. The gaps created by the round coil shapes in the pattern create unheated areas on the cooktop.

The rectangular coil shapes can facilitate the distribution of heat due to better coverage when a cookware partly covers the edges (e.g., when a cookware is positioned between two coils. Cooktop systems can include a pattern of a plurality of rectangular coil shapes can detect cookware between rectangular coil shapes, and distribute heat between the rectangular coil shapes. Rectangular coil shapes can create non-homogeneous heat distribution due to the structure of the rectangular coil shapes, and rectangular coil shapes can have reduced performance compared to round coil shapes because the percentage of the pan coverage in relation to the coil shape is reduced.

The systems and methods described herein facilitate an improved ability to detect various sizes of cookware on a cooktop surface including small cookware. The systems and methods described herein facilitate an improved ability to detect one or more cookware devices located between the induction coils of a cooktop system. The systems and methods described herein facilitate an improved ability to distribute heat between induction coils and to reduce the amount of areas without heating (i.e., dead zones) across a cooktop. The systems and methods described herein provide an arrangement of the induction coils that facilitates the attenuation of magnetic fields in the cooktop system, and a reduction, minimization, or removal of magnetic fields emitted from the outer surfaces of the cooktop system.

The details of one or more implementations are set forth in the accompanying drawings and the description below. Other features, objects, and advantages will be apparent from the description and drawings, and from the claims.

DETAILED DESCRIPTION

This document describes systems and methods for systems for heating systems including induction heating systems. The heating systems and induction heating systems described herein can include induction coils that are implemented in cooktop systems for heating one or more cookware devices. The shape of induction coils and the arrangement of the induction coils in the cooktop systems described herein significantly improve the performance of the induction coils and cooktop systems.

Figure 1:
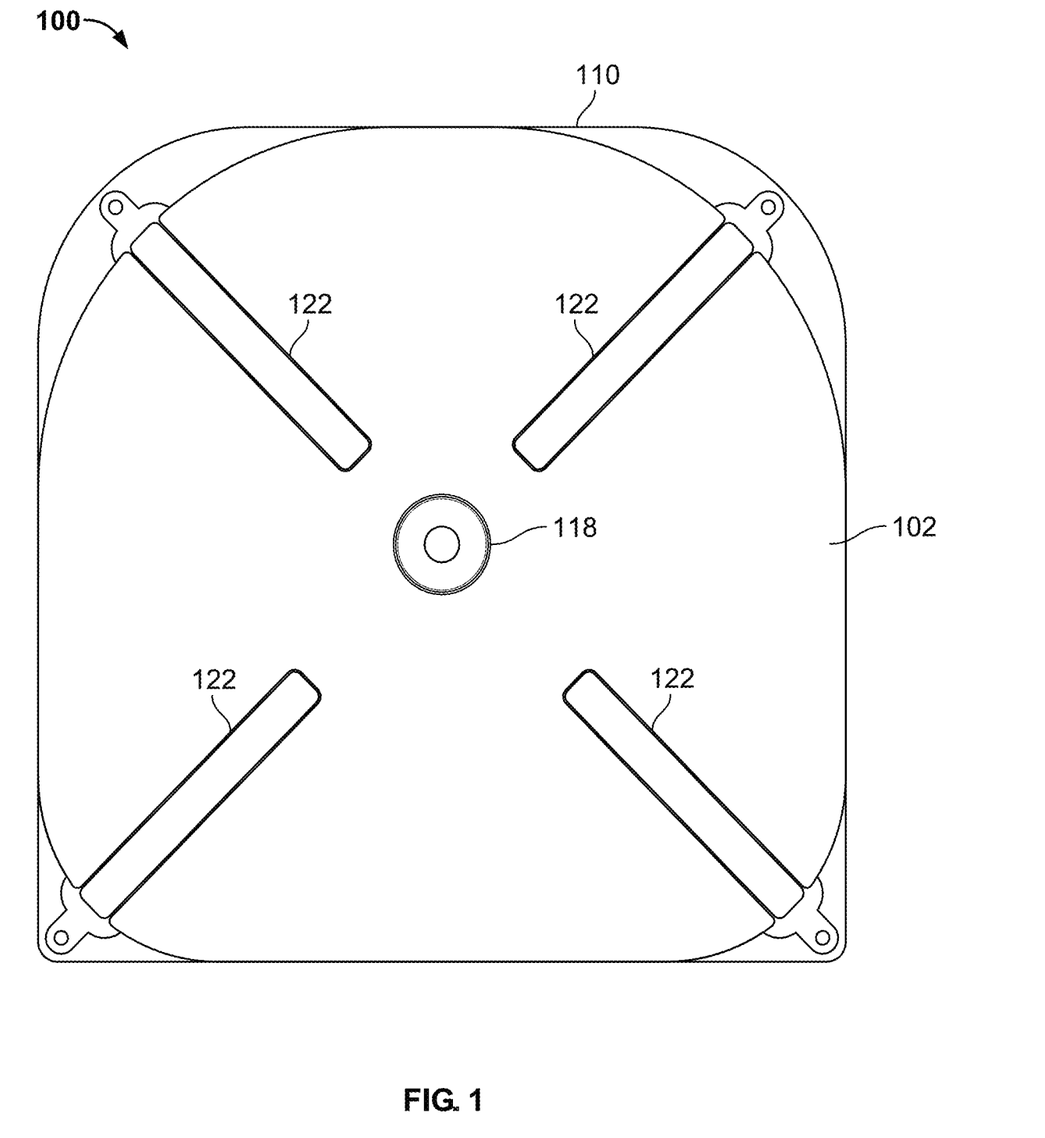
FIG. 1 shows an example cooktop system, consistent with embodiments of this disclosure.
Figure 2:
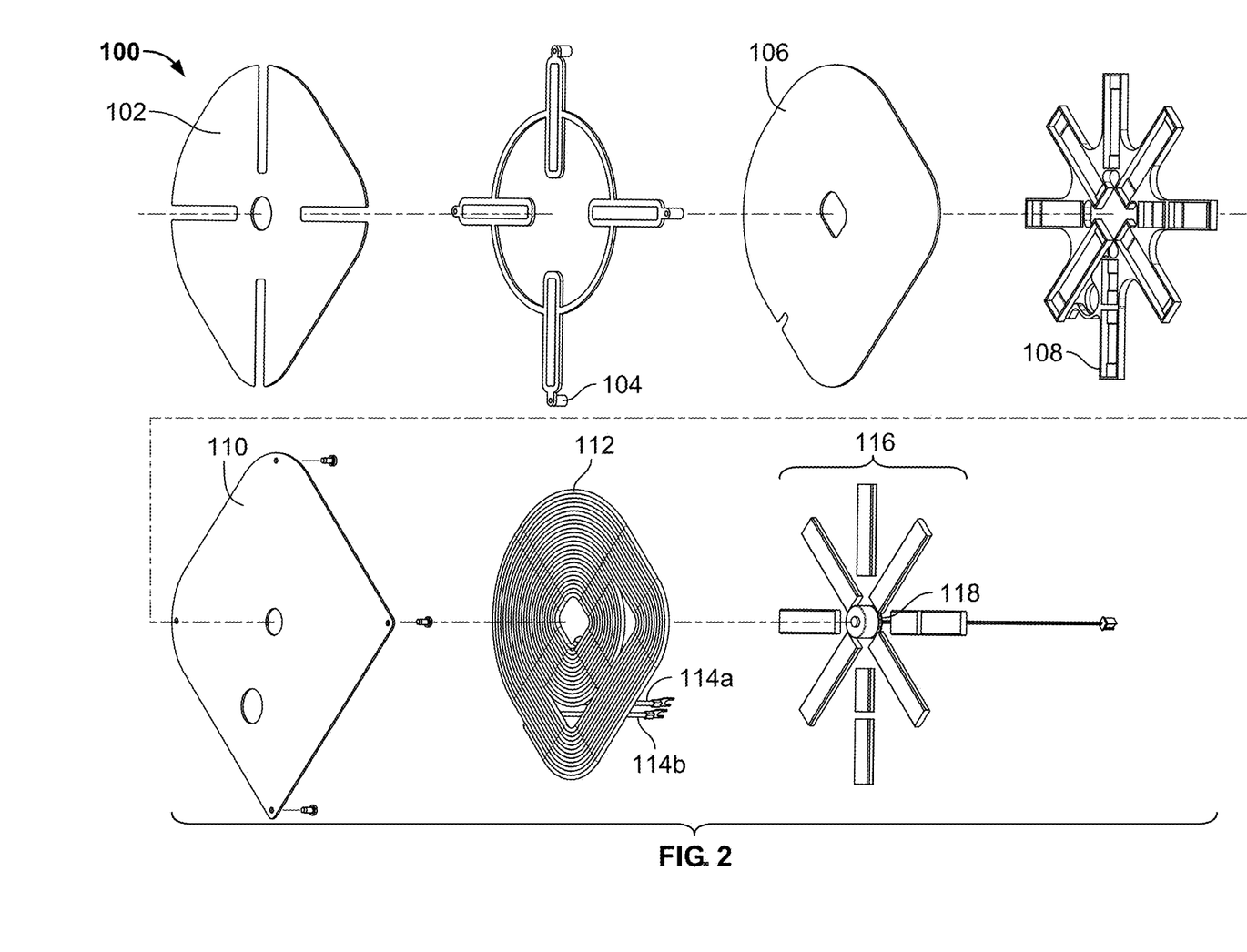
FIG. 2 shows an example exploded view of the cooktop system of FIG. 1.

FIGS. 1 and 2 show an example cooktop system 100 consistent with embodiments of this disclosure. The cooktop system 100 includes a top surface 102, top surface support elements 104, mid-support plate 106 (e.g., mica plate), mid-support elements 108, lower support plate 110, an induction coil 112, electric connectors 114*a*, 114*b*, lower support elements 116, and a sensor 118. The cooktop system 100 can include a stack of components that are attached to each other to form the cooktop system 100.

In some aspects, the top surface 102 can be a cooktop surface of the cooktop system 100, where the top surface 102 is configured to contact one or more cookware devices that are heated by the cooktop system 100. The top surface support elements 104 can support the top surface 102 above the mid-support plate 106. In some aspects, the top surface 102 has one or more channels 120 that receive arms 122 of the top surface support elements 104. The top surface support elements 104 can connect to the lower support plate 110 and extend around the mid-support plate 106 and the mid-support elements 108. The mid-support plate 106 can be a mica plate that is positioned between the mid-support elements 108 and the top surface support elements 104. The lower support plate 110 can be an aluminum plate that is positioned between the mid-support elements 108 and the induction coil 112. The lower support elements 116 can be positioned below the induction coil 112, and the sensor 118 can be positioned interior to the lower support elements 116 and below the induction coil 112. In some aspects, the sensor 118 is a negative temperature coefficient thermistor.

Figure 3:
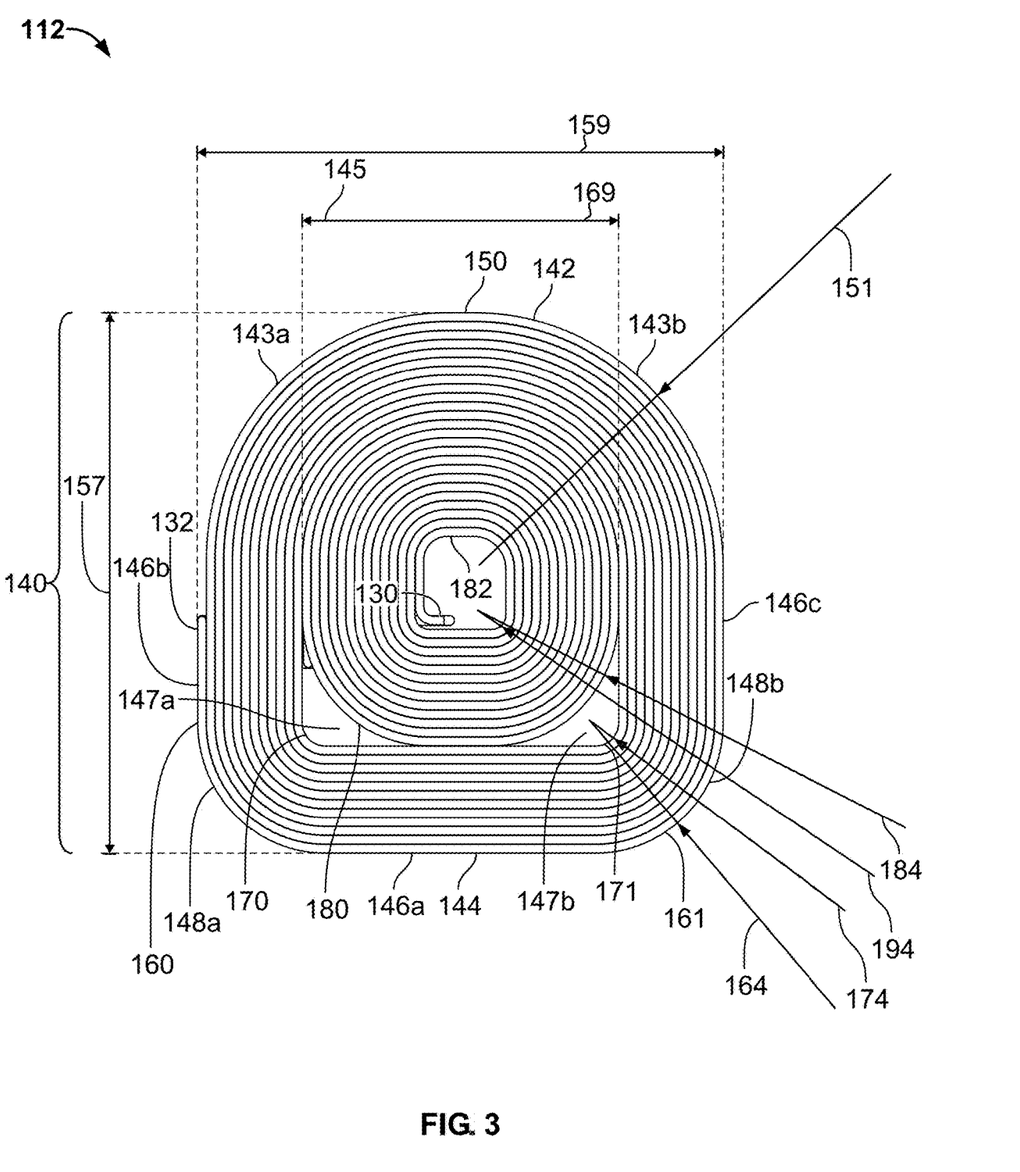
FIG. 3 shows a top view of an example induction coil, consistent with embodiments of this disclosure.

FIG. 3 shows a top view of the induction coil 112, consistent with embodiments of this disclosure. The induction coil 112 extends from a first end 130 to a second end 132. The induction coil 112 can be a continuous coil that extends between the first end 130 and the second end 132 that includes a plurality of turns that wind the induction coil 112 into one or more shapes. The induction coil 112 can include an outer profile 140 that can include a rounded portion 142 and a rectangular portion 144. The induction coil can also optionally include an inner profile 145 and one or more gaps 147*a*, 147*b* between the rectangular portion 144 and the inner profile 145.

The induction coil 112 includes an outer profile 140 that can include a rounded portion 142 and a rectangular portion 144. The rounded portion 142 extends around a portion of the outer profile 140 and the rectangular portion 144 extends around another portion of the outer profile 140. The outer profile 140 forms a geometric shape having four corners 143*a*, 143*b*, 148*a*, 148*b* that are positioned between four edges 142, 146*a*, 146*b*, and 146*c*, where one of the four edges (i.e., rounded portion 142) is a curved edge and three of the edges are straight edges 146*a*, 146*b*, and 146*c*. Accordingly, the outer profile 140 includes both a rounded portion 142 and a rectangular portion 144 of the same induction coil 112 that is formed into each respective shape between the first end 130 and the second end 132.

The rounded portion 142 includes a semi-circular outer shape. In some aspects, the rounded portion 142 includes semi-circular shape that has a continuous radius throughout the rounded portion 142. The rounded portion 142 can be positioned in the outer profile 140 such that the rounded portion 142 extends through corners 143*a* and 143*b* of the outer profile 140. In some aspects, the rounded portion 142 can extend around 20%, 30%, 40%, 50%, 60%, 70%, or 80% of the outer profile 140.

The rectangular portion 144 includes a rectangular outer shape that includes one or more straight edges. For example, the rectangular portion 144 includes straight edges 146*a*, 146*b*, and 146*c*. The straight edge 146*a* can extend to each straight edge 146*b*, 146*c* around rounded corners 148*a* and 148*b* of the rectangular portion 144. The straight edge 146*a* extends in a direction that is generally orthogonal from the direction of each straight edge 146*b*, 146*c*, and each straight edge 146*b*, 146*c* can extend in a direction that is parallel to each other. In some aspects, the rectangular portion 144 can extend around 20%, 30%, 40%, 50%, 60%, 70%, or 80% of the outer profile 140.

The outer profile 140 includes at least two different shaped portions that form its outer profile. In some aspects, the outer profile 140 includes a hybrid shape that has both a rounded portion 142 and a rectangular portion 144. For example, the outer profile can include 50% of the rounded portion 142 and 50% of the rectangular portion 144, 40% of the rounded portion and 60% of the rectangular portion, 30% of the rounded portion and 70% of the rectangular portion, or 20% of the rounded portion and 80% of the rectangular portion. In some examples, the outer profile can include 60% of the rounded portion and 40% of the rectangular portion, 70% of the rounded portion and 30% of the rectangular portion, or 80% of the rounded portion and 20% of the rectangular portion. The outer profile 140 includes a length 157 and a width 159. In some aspects, the length 157 and the width 159 have the same or substantially similar dimensions (e.g., within a ±5% difference). In some aspects, the length 157 is between 100 and 300 mm, between 150 and 250 mm, between 175 and 225 mm, between 190 and 200 mm, or about 193 mm. In some aspects, the width 159 is between 100 and 300 mm, between 150 and 250 mm, between 175 and 225 mm, between 190 and 200 mm, or about 193 mm.

The induction coil 112 can be a continuous coil that extends between the first end 130 and the second end 132 and includes a plurality of turns that wind the induction coil 112 into one or more shapes (e.g., rounded portion 142, rectangular portion 144, and inner profile 145 described below).

The rounded portion 142 includes a first series of turns that includes an outermost turn 150 at the outer profile 140 of the rounded portion 142. The outermost turn 150 of the rounded portion 142 has a radius 151 that is defined from the outermost turn 150 to a center of the induction coil 112. In some aspects, the radius 151 can be between 70 and 110 mm, between 80 and 100 mm, between 85 and 95 mm, and around 92 mm. In some aspects, a ratio of the width 159 to the radius 151 is about 2:1 and the ratio of the length 157 to the radius 151 is about 2:1.

Each successive turn of the rounded portion 142 interior to the outermost turn 150 has a successively smaller radius than the radius 151. Each successive turn of the rounded portion 142 has a successively smaller radius that maintains a continuous spacing of the plurality of turns such that the plurality of turns are aligned with each other in a successive winding pattern. In some aspects, the successive winding pattern maintains a minimal gap (e.g., around 1 mm) between each of the plurality of turns of the rounded portion 142. In some aspects, the successive winding pattern maintains contact between each of the plurality of turns of the rounded portion 142 such that there is no gap between each of the plurality of turns of the rounded portion 142.

In some aspects, the rectangular portion 144 includes at least two sets of turns that are aligned with each rounded corner 148a, 148b of the rectangular portion 144. The two sets of turns can be symmetrical such that the rectangular portion 144 provides a generally rectangular shape as compared to the rounded portion 142. The first set of turns includes an outermost turn 160 aligned with the first outermost turn 148a, and the second set of turns includes a second outermost turn 161 aligned with the rounded corner 148b.

The outermost turn 161 of the rectangular portion 144 has a radius 164 that is defined from the outermost turn 161 to a center of the gap 147b between the inner profile 145 and the rectangular portion 144. In some aspects, the radius 164 can be between 20 and 70 mm, between 30 and 60 mm, between 40 and 50 mm, and around 47 mm. The outermost turn 160 can have the same or substantially similar dimensions (e.g., within a ±5% difference) to the outermost turn 161.

The rectangular portion 144 can include a plurality of successive turns of the induction coil 112 between the outermost turns 160, 161 and one or more inner most turns 170 and 171 that are aligned with each rounded corner 148a, 148b of the rectangular portion 144. The inner most turns 170 and 171 of the rectangular portion 144 are positioned adjacent to the gaps 147a, 147b, and the inner most turns 170 and 171 have a smaller radius than the outermost turns 160, 161.

The inner most turn 171 of the rectangular portion 144 has a radius 174 that is defined from the inner most turn 171 to a center of the gap 147b between the inner profile 145 and the rectangular portion 144. In some aspects, the radius 174 can be between 1 and 30 mm, between 1 and 20 mm, between 1 and 10 mm, and around 8 mm. The inner most turn 170 can have the same or similar dimensions to the inner most turn 171. In some aspects, the radius 164 is about 20%, 30%, 40%, 50%, 60%, 70%, 80%, or 90% greater than the radius 174.

Each successive turn of the rectangular portion 144 interior to the outermost turns 160, 161 has a successively smaller radius than the radius 164. Each successive turn of the rectangular portion 144 has a successively smaller radius that maintains a continuous spacing of the plurality of turns such that the plurality of turns are aligned with each other in a successive winding pattern. In some aspects, the successive winding pattern maintains a minimal gap between each of the plurality of turns of the rectangular portion 144. In some aspects, the successive winding pattern maintains contact between each of the plurality of turns of the rectangular portion 144 such that there is no gap between each of the plurality of turns of the rectangular portion 144.

The inner profile 145 is positioned interior to the outer profile 140 between an outermost turn 180 and an inner most turn 182 of the inner profile 145. The inner profile 145 has a rounded shape, and the rounded shape of the inner profile 145 can have a shape that continues and matches the successive winding pattern of the rounded portion 142. For example, the outermost turn 180 of the inner profile 145 can maintain a minimal gap with the successive winding pattern of the rounded portion 142 such that there is minimal or no gap between the outermost turn 180 of the inner profile 145 and the inner most turn of the rounded portion 142. The outermost turn 180 of the inner profile 145 can be separated from the inner most turns 170, 171 of the rectangular portion 144 along the gaps 147a, 147b.

The outermost turn 180 of the inner profile 145 has a radius 184 that is defined from the outermost turn 180 to a center of the inner profile 145. In some aspects, the radius 184 can be between 20 and 70 mm, between 30 and 60 mm, between 40 and 50 mm, and around 46 mm.

The inner most turn 182 of the inner profile 145 has a radius 194 that is defined from the inner most turn 182 to a center of the inner profile 145. In some aspects, the radius 194 can be between 1 and 30 mm, between 1 and 20 mm, between 1 and 10 mm, and around 5 mm. In some aspects, the radius 194 is about 20%, 30%, 40%, 50%, 60%, 70%, 80%, or 90% greater than the radius 184.

The inner profile 145 includes width 169. In some aspects, the inner profile the width 169 and the length of the inner profile 145 have the same or substantially similar dimensions (e.g., within a ±5% difference). In some aspects, the width 169 is between 50 and 200 mm, between 70 and 150 mm, between 80 and 140 mm, between 100 and 120 mm, or about 116 mm.

Each successive turn of the inner profile 145 interior to the outermost turn 180 has a successively smaller radius than the radius 184. Each successive turn of the inner profile 145 has a successively smaller radius that maintains a continuous spacing of the plurality of turns such that the plurality of turns are aligned with each other in a successive winding pattern. In some aspects, the successive winding pattern maintains a minimal gap between each of the plurality of turns of the inner profile 145. In some aspects, the successive winding pattern maintains contact between each of the plurality of turns of the inner profile 145 such that there is no gap between each of the plurality of turns of the inner profile 145.

Figure 4:
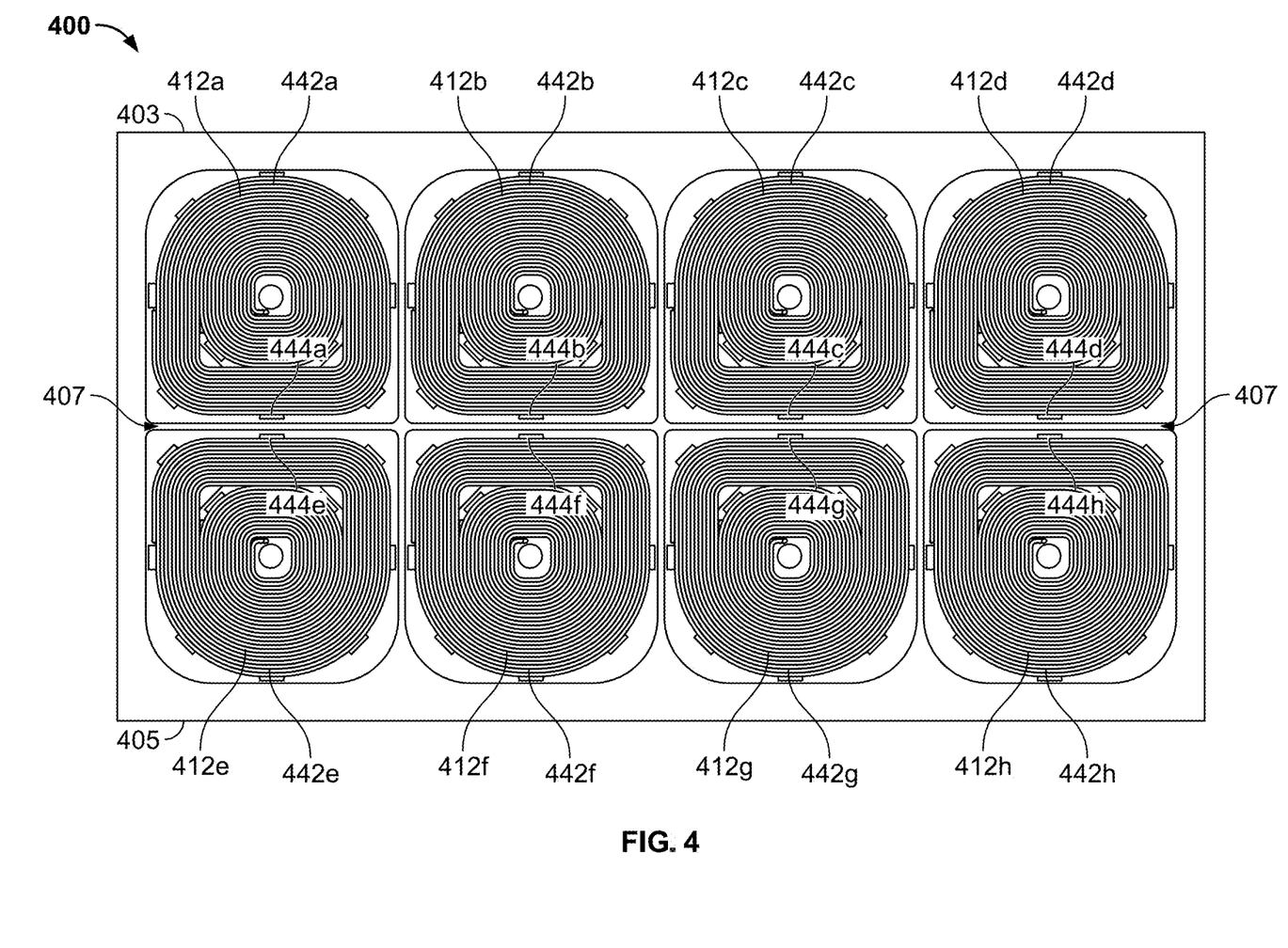
FIG. 4 shows a top view of an example cooktop system, consistent with embodiments of this disclosure.

FIG. 4 shows a top view of an example cooktop system 400 that is configured to heat one or more cookware devices, consistent with embodiments of this disclosure. The cooktop system 400 includes a plurality of induction coils 412*a*, 412*b*, 412*c*, 412*d*, 412*e*, 412*f*, 412*g*, 412*h* positioned around the cooktop system 400. The plurality of induction coils 412*a*, 412*b*, 412*c*, 412*d*, 412*e*, 412*f*, 412*g*, 412*h* can share the features of the induction coil 112.

The plurality of induction coils 412*a*, 412*b*, 412*c*, 412*d*, 412*e*, 412*f*, 412*g*, 412*h* includes a first group of induction coils (e.g., induction coils 412*a*, 412*b*, and 412*c*, 412*d*) and a second group of induction coils (e.g., induction coils 412*e*, 412*f*, 412*g*, 412*h*). The rounded portions 442*a*, 442*b*, 442*c*, 442*d* of the first group 412*a*, 412*b*, 412*c*, 412*d* face a first outer side 403 of the cooktop system 400. The rounded portions 442*e*, 442*f*, 442*g*, 442*h* of the second group 412*e*, 412*f*, 412*g*, and 412*h* face a second outer side 405 of the cooktop system 400. The first outer side 403 and the second outer side 405 are on opposing sides of the cooktop system 400.

The rectangular portions 444*a*, 444*b*, 444*c*, 444*d* of the first group 412*a*, 412*b*, 412*c*, 412*d* face the rectangular portions 444*e*, 444*f*, 444*g*, 444*h* of the second group 412*e*, 412*f*, 412*g*, 412*h* at an internal portion 407 of the cooktop system 400. Each rectangular portion of the first group 412*a*, 412*b*, 412*c*, 412*d* is aligned in an opposing arrangement with a respective rectangular portion of the second group 412*e*, 412*f*, 412*g*, and 412*h*. For example, the rectangular portion 444*a* of the induction coil 412*a* is aligned with the rectangular portion 444*e* of the induction coil 412*e*, the rectangular portion 444*b* of the induction coil 412*b* is aligned with the rectangular portion 444*f* of the induction coil 412*f*, the rectangular portion 444*c* of the induction coil 412*c* is aligned with the rectangular portion 444*g* of the induction coil 412*g*, and the rectangular portion 444*d* of the induction coil 412*d* is aligned with the rectangular portion 444*h* of the induction coil 412*h*.

Figure 5A:
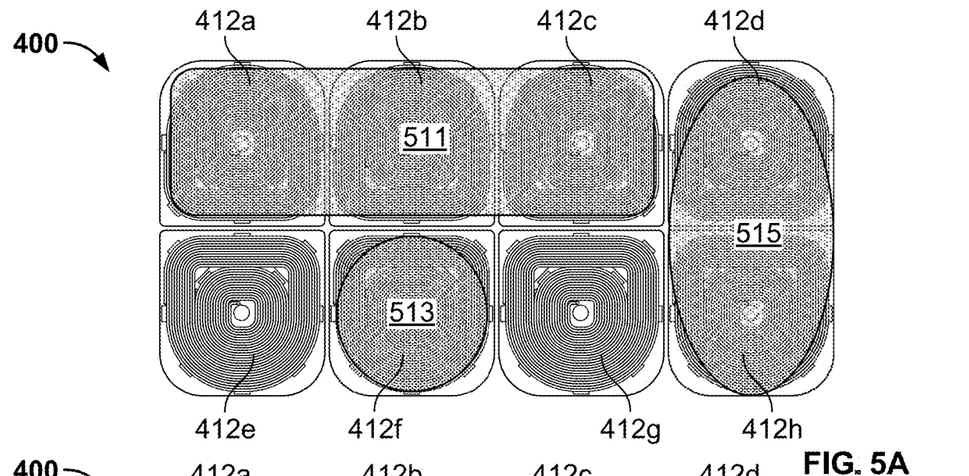
FIGS. 5A-5C show top views of example cooktop systems with example cookware positioned on the cooktop systems, consistent with embodiments of this disclosure.
Figure 5B:
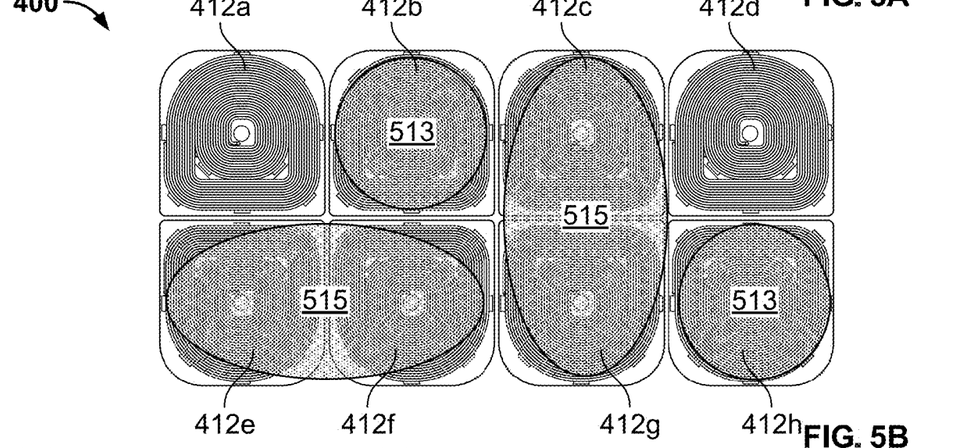
Figure 5C:
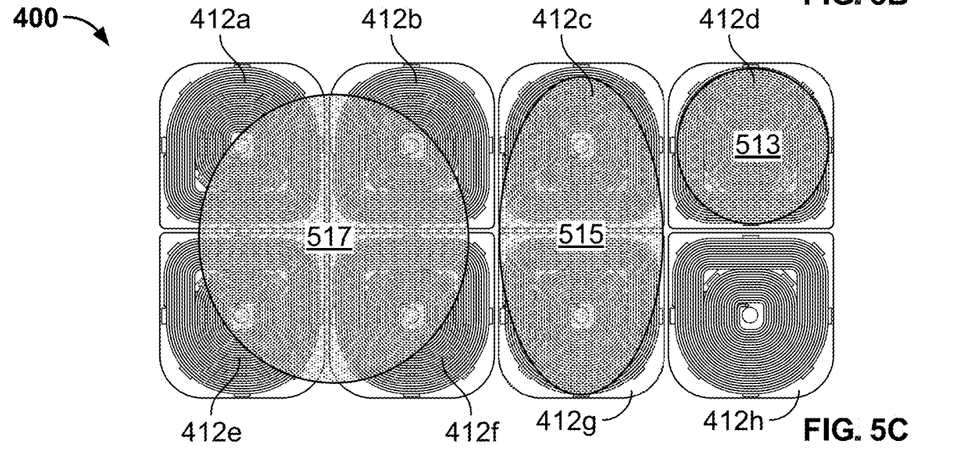

FIGS. 5A-5C show top views the cooktop system 400 with example cookware positioned on the cooktop system 400. For example, FIG. 5A illustrates a rectangular cookware 511 that spans across induction coils 412*a*, 412*b*, and 412*c*, a round cookware 513 positioned over induction coil 412*f*, and an ovular cookware 515 positioned over induction coils 412*d*, 412*h*. In another example, FIG. 5B illustrates a round cookware 513 positioned over induction coil 412*b* and a round cookware 513 positioned over induction coil 412*h*, an ovular cookware 515 over induction coils 412*e* and 412*f* and an ovular cookware 515 over induction coils 412*c* and 412*g*. In another example, FIG. 5C illustrates a round cookware 513 positioned over induction coil 412*d*, an ovular cookware 515 over induction coils 412*c* and 412*g*, and a large round cookware 517 over induction coils 412*a*, 412*b*, 412*e*, and 412*f*.

The induction coils provide heating to each of the cookware devices and facilitate heating in the cooktop system 400 to the areas of the cooktop system 400 that are occupied by one or more cookware devices via one or more induction coils. FIGS. 5A-5C show non-limiting examples of the arrangement of cookware devices over the cooktop system 400, where the plurality of induction coils facilitate heating across the cooktop system 400.

Figure 6:
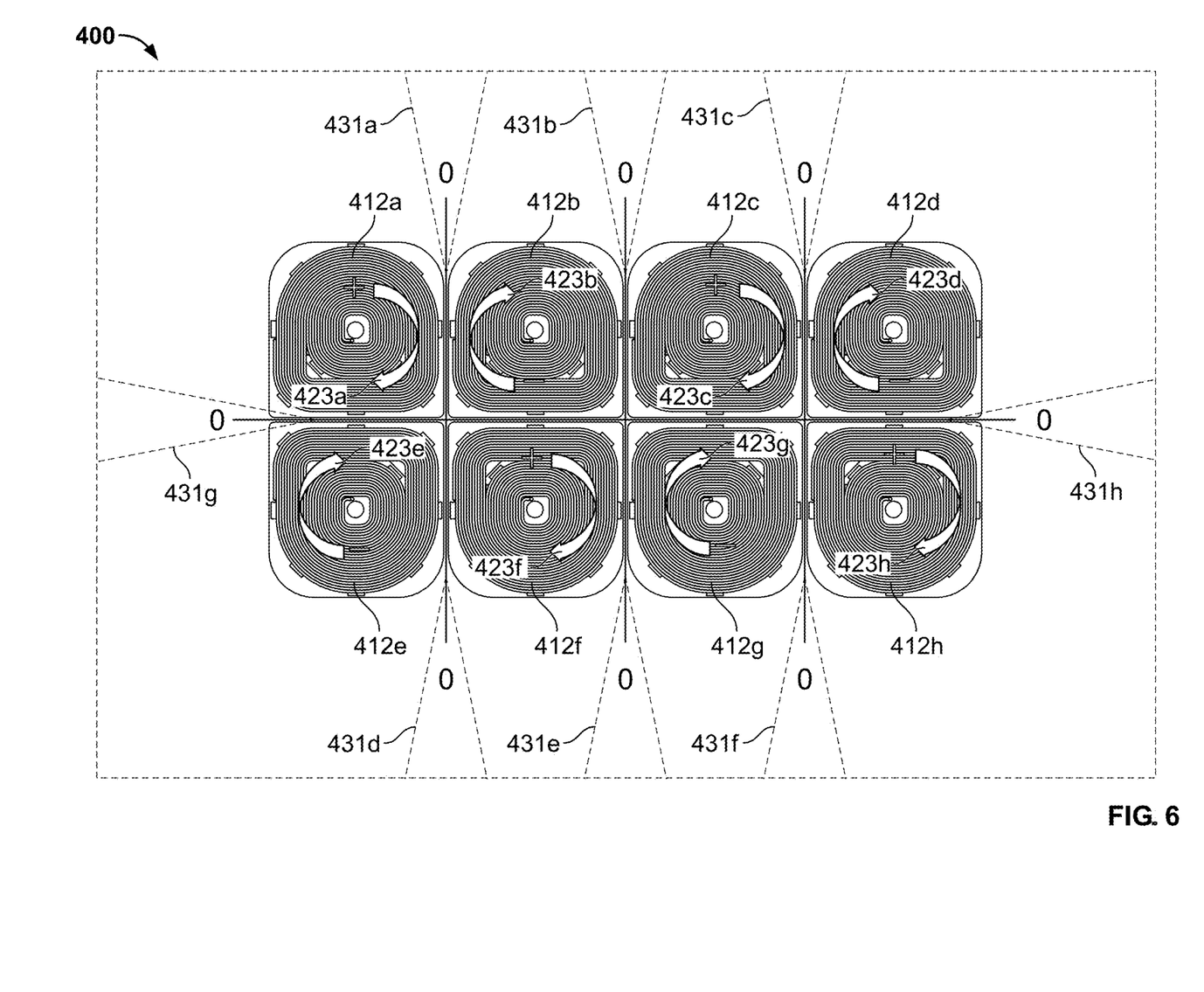
FIG. 6 shows a schematic view of an example cooktop system with exemplary magnetic fields illustrated, consistent with embodiments of this disclosure.

FIG. 6 shows a schematic view of the cooktop system 400 with schematically illustrated exemplary magnetic fields that are generated by each induction coil. In some aspects, each induction coil of the first group of induction coils 412*a*, 412*b*, 412*c*, and 412*d* generates a magnetic field 423*a*, 423*b*, 423*c*, 423*d* that rotates in a first direction. In some aspects, the first direction is clockwise, in other aspects, the first direction is counterclockwise.

In some aspects, each induction coil of the second group 412*e*, 412*f*, 412*g*, and 412*h* of induction coils generates a magnetic field 423*e*, 423*f*, 423*g*, 423*h* that rotates in a second direction. In some aspects, the second direction is counterclockwise, in other aspects, the second direction is clockwise. In some aspects, the first direction is different from the second direction. For example, the first direction is clockwise and the second direction is counterclockwise. In another example, the first direction is counterclockwise and the second direction is clockwise. In some aspects, the first direction and the second direction oppose one another.

Each magnetic field 423*a*, 423*b*, 423*c*, 423*d* of the first group 412*a*, 412*b*, 412*c*, 412*d* is aligned in an opposing arrangement with a respective magnetic field 423*e*, 423*f*, 423*g*, 423*h* of the second group 412*e*, 412*f*, 412*g*, 412*h*. For example, the magnetic field 423*a* of the induction coil 412*a* is rotates to oppose the magnetic field 423*e* of the induction coil 412*e*, the magnetic field 423*b* of the induction coil 412*b* rotates to oppose the magnetic field 423*f* of the induction coil 412*f*, the magnetic field 423*c* of the induction coil 412*c* rotates to oppose the magnetic field 423*g* of the induction coil 412*g*, and the magnetic field 423*d* of the induction coil 412*d* rotates to oppose the magnetic field 423*h* of the induction coil 412*h*.

The cooktop system 400 emits a reduced electromagnetic field externally. In some aspects, the emitted magnetic fields from the cooktop system 400 are attenuated by the respective first and second directions of each of the magnetic fields of the induction coils being in different directions (e.g., in opposing directions). For example, emission areas 431*a*, 431*b*, 431*c*, 431*d*, 431*e*, 431*f*, 431*g*, 431*h* can emit a minimal electromagnetic field or no magnetic field. The reduced emission of magnetic fields from the cooktop system 400 is advantageous for users of the cooktop system 400 by reducing, minimizing, or eliminating the exposure of the user to the electromagnetic fields generated by the induction coils.

Figure 7:
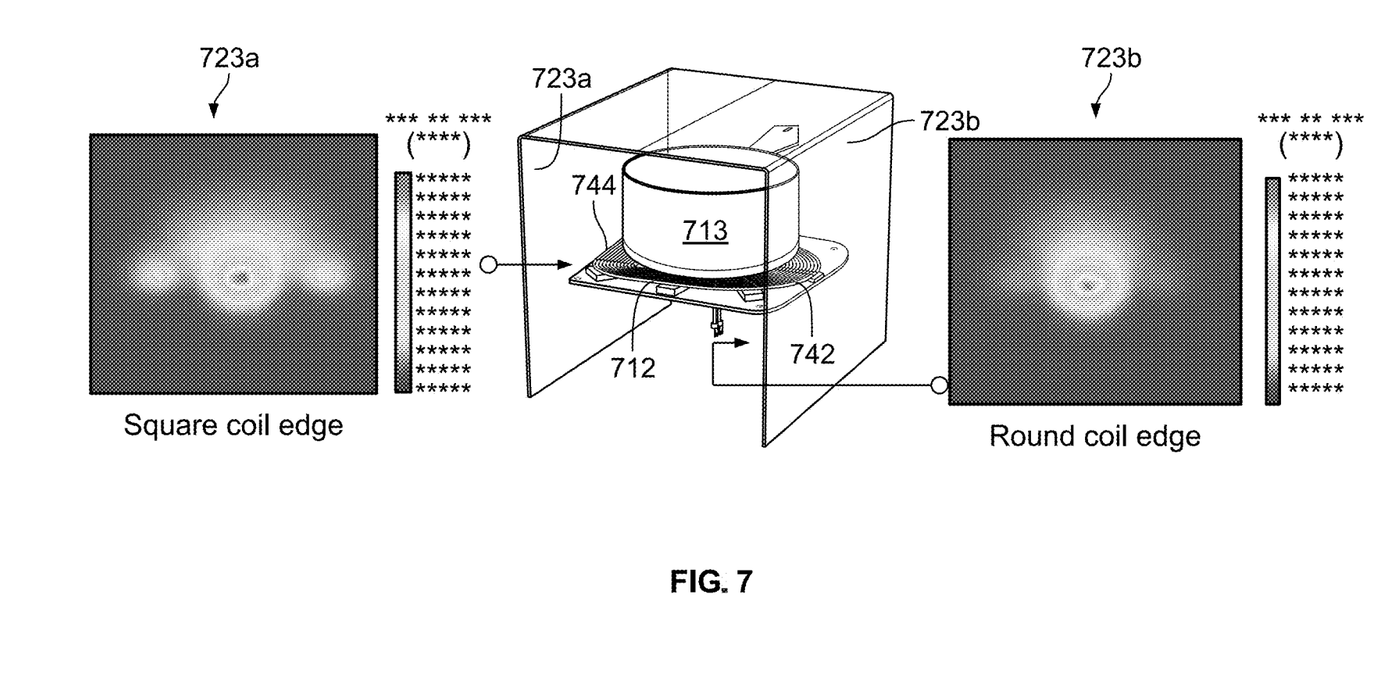
FIG. 7 shows a schematic view of example magnetic fields of coil edges, consistent with embodiments of this disclosure.

FIG. 7 shows a schematic view of example magnetic fields of exemplary coil edge shapes. An induction coil 712 heats a cookware 713 via induction heating as described in reference to induction coils 112, 412. The induction coil 712 shares the features of induction coils 112, 412, including having a rounded portion 742 and a rectangular portion 744.

The rectangular portion 744 and the rounded portion 742 generate different magnetic fields than each other. For example, the rectangular portion 744 generates a magnetic field 723*a* and the rounded portion 742 generates a magnetic field 723*b*. The magnetic field strength that is generated is dependent on the distance from the source. A formula for the magnitude of the magnetic field at a distance way, r, from the center of the dipole, and along a 'radius' at angle θ to the axis is:

$$B = \frac{\mu_0 AI \sqrt{1 + \cos^2(\theta)}}{4\pi r^3}$$

In some aspects, the rounded portion 742 emits around 20% less magnetic field compared to a rectangular portion 744.

Figure 8:
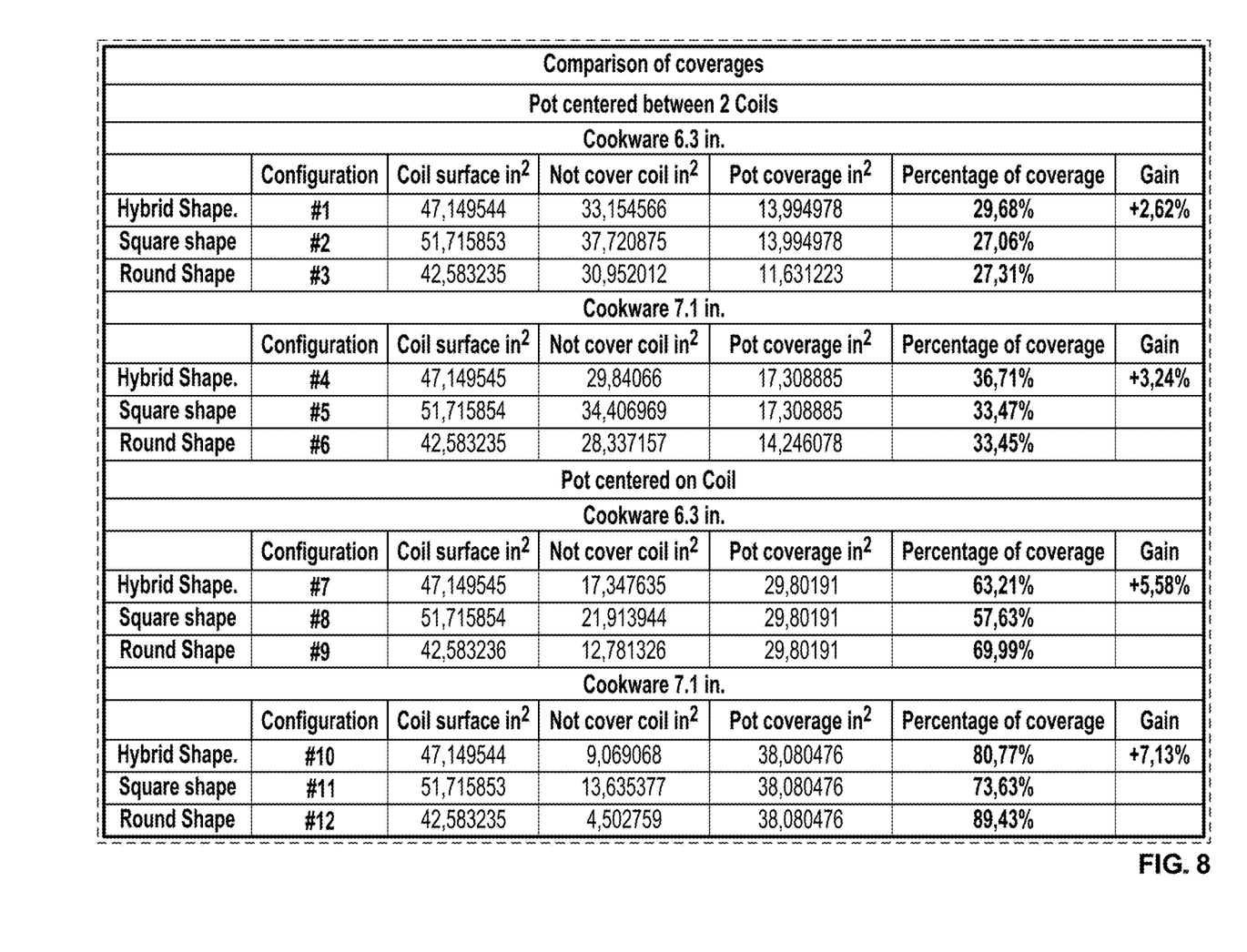
FIG. 8 shows a table of performance results for several configurations of cooktop systems and top views of example cooktop systems with example cookware positioned on the cooktop systems, consistent with embodiments of this disclosure. Like reference symbols in the various drawings indicate like elements.

FIG. 8 shows tables with performance results for the associated top views of example cooktop systems with example cookware positioned on the cooktop systems. The performance of each respective arrangement will be described and compared below by comparing a hybrid shape, a round shape, and a rectangular shape of induction coils. The hybrid shape includes induction coils that have a rounded portion and a rectangular portion, and the hybrid shape can share the features of induction coils 112, 412, 712.

The arrangements shown in configurations #1 to #12 include two induction coils of the same shape aligned with each other. For example, the configurations #1, #4, #7, and #10 include two induction coils arranged in a similar manner to the induction coils 412*a* and 412*e* of FIG. 4. The configurations #2, #5, #8, and #11 include two square induction coils. The configurations #3, #6, #9, and #12 include two round induction coils.

In some aspects, configuration #1 shows an improvement over configurations #2 and #3 both by improving the percentage of coverage and by improving heat distribution with the pot centered between two coils. In some aspects, configuration #1 has at least a 2.62% improvement in the percentage of coverage over configurations #2 and #3. In some aspects, configuration #1 has at least a 15.86% improvement in heat distribution over configurations #2 and #3.

In some aspects, configuration #4 shows an improvement over configurations #5 and #6 both by improving the percentage of coverage and by improving heat distribution with the pot centered between two coils. In some aspects, configuration #4 has at least a 3.24% improvement in the percentage of coverage over configurations #5 and #6. In some aspects, configuration #4 has at least a 16.09% improvement in heat distribution over configurations #5 and #6.

In some aspects, configuration #7 shows an improvement over configurations #8 and #9 by improving the percentage of coverage with the pot centered on the coil. In some aspects, configuration #7 has at least a 5.58% improvement in the percentage of coverage over configurations #8 and #9.

In some aspects, configuration #10 shows an improvement over configurations #11 and #12 by improving the percentage of coverage with the pot centered on the coil. In some aspects, configuration #10 has at least a 7.13% improvement in the percentage of coverage over configurations #11 and #12.

Accordingly, the hybrid shape that includes the rounded portion and the rectangular portion exhibits improved performance characteristics over round coils and square coils.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination.

Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A cooktop system comprising:
a plurality of induction coils, each induction coil comprising:
an induction coil that extends from a first end to a second end, the induction coil includes a plurality of turns that define a shape, the shape comprising:
an outer profile that includes a rounded portion and a rectangular portion, the rounded portion extends around a portion of the outer profile and the rectangular portion extends around another portion of the outer profile; and
the plurality of induction coils includes a first group of induction coils positioned along an operator side of the cooktop system and a second group of induction coils positioned along a rear side of the cooktop system opposite the operator side, where the rounded portion of the first group faces a first outer side of the cooktop system along the operator side and the rounded portion of the second group faces a second outer side of the cooktop system along the rear side of the cooktop system each induction coils of the first group of induction coils is configured to generate a magnetic field that rotates in a first direction and each induction coil of the second group of induction coils is configured to generate a magnetic field that rotates in a second direction that is opposite the first direction;
wherein one or more emitted magnetic fields along the operator side, rear side, and along each respective lateral sides of the cooktop system are attenuated by the first direction and second direction of each of the magnetic fields of the plurality of induction coils being in different directions.

2. The cooktop system of claim 1, wherein the rectangular portion of the first group faces the rectangular portion of the second group at an internal portion of the cooktop system.

3. The cooktop system of claim 2, wherein each rectangular portion of the first group is aligned in an opposing arrangement with a respective rectangular portion of the second group.

4. The cooktop system of claim 1, wherein the one or more emitted magnetic fields includes a minimal magnetic field along the operator side of the cooktop system.

5. The cooktop system of claim 4, wherein the one or more emitted magnetic fields include a plurality of emissions areas extending from an area between each of the induction coils of the first group, between each of the induction coils of the second group, and between at least one outermost coil of the first group and at least one outermost coil of the second group, wherein each of the emissions areas includes a minimal magnetic field.

6. The cooktop system of claim 1, wherein a ratio of a radius of the rounded portion to a width of the outer profile is about 2:1.

7. The cooktop system of claim 1, wherein the rounded portion of each induction coil comprises a semi-circular outer shape.

8. The cooktop system of claim 1, further comprising one or more gaps between the rectangular portion of the outer profile and an inner profile of each induction coil system.

9. The cooktop system of claim 1, wherein the first outer side and the second outer side are on opposing sides of the cooktop system.

10. The cooktop system of claim 1, wherein the first group of induction coil systems includes four induction coils positioned along the operator side of the cooktop system and the second group of induction coils includes four induction coil systems positioned along the rear side of the cooktop system.

* * * * *